United States Patent [19]
Okano

[11] Patent Number: 5,431,441
[45] Date of Patent: Jul. 11, 1995

[54] SYSTEM FOR CONTROLLING SAFETY DEVICE FOR VEHICLE

[75] Inventor: Masami Okano, Gumma, Japan

[73] Assignee: Airbag Systems Company, Ltd., Gumma, Japan

[21] Appl. No.: 237,106

[22] Filed: May 3, 1994

[30] Foreign Application Priority Data

May 10, 1993 [JP] Japan .................. 5-132636

[51] Int. Cl.⁶ .............................. B60R 21/16
[52] U.S. Cl. ...................... 280/735; 307/10.1
[58] Field of Search ............ 280/735, 734; 307/10.1; 364/424.05; 340/436; 180/282

[56] References Cited

U.S. PATENT DOCUMENTS

| | | | |
|---|---|---|---|
| 5,189,311 | 2/1993 | Moriyama | 307/10.1 |
| 5,208,484 | 5/1993 | Okano et al. | 307/10.1 |
| 5,262,949 | 11/1993 | Okano et al. | 364/424.05 |
| 5,369,305 | 11/1994 | Duhan et al. | 307/10.1 |

FOREIGN PATENT DOCUMENTS

| | | | |
|---|---|---|---|
| 3-243445 | 10/1991 | Japan | . |
| 4-221251 | 8/1992 | Japan | 280/735 |

Primary Examiner—Karin L. Tyson
Attorney, Agent, or Firm—Fish & Richardson

[57] ABSTRACT

A control system comprises an acceleration sensor for detecting an acceleration of a vehicle, an integral circuit for integrating a signal from the acceleration sensor, and a collision judgment circuit for comparing the integral value with a trigger threshold level and outputs a trigger signal when the integral value, which is increased in a decelerating direction, exceeds the trigger threshold level. A drive circuit of the control system includes an activator of the safety device for a vehicle, and a switching element which is connected to the activator in series and turned on in response to the trigger signal. The control system further comprises a band-pass filter for allowing passage of comparatively high particular frequency band components contained in the acceleration signal, and an adjustment circuit for adjusting the trigger threshold level based on the acceleration components which have passed the band-pass filter.

8 Claims, 4 Drawing Sheets

ACCELERATION SIGNAL
WHICH HAS PASSED
HIGH FREQUENCY
BAND-PASS FILTER

INTEGRAL VALUE
IN SECOND INTEGRAL
CIRCUIT

TRIGGER THRESHOLD
LEVEL

ACCELERATION SIGNAL
WHICH HAS PASSED
LOW FREQUENCY
BAND PASS FILTER

INTEGRAL VALUE
IN FIRST INTEGRAL
CIRCUIT

TRIGGER SIGNAL

5,431,441

SYSTEM FOR CONTROLLING SAFETY DEVICE FOR VEHICLE

BACKGROUND OF THE INVENTION

This invention relates to a system for controlling a safety device for a vehicle such as air bag device, pretensioner of a seat belt or the like.

Recently, in order to ensure the safety of passengers, as well as a driver, of a vehicle, various safety devices such as an air bag device, a pretensioner of a seat belt and the like are developed. It is demanded for any of these safety devices that they are assuredly activated at a good timing when a vehicle collision has occurred, and that they are not activated accidentally when a vehicle is running in a normal condition.

In a conventional system for controlling an air bag device, a squib drive circuit is provided between a battery which is mounted on a vehicle and the ground. This squib drive circuit comprises a transistor (switching means) and a squib (activator) for an air bag, both arranged in series. When electric current is supplied to the squib, the latter is ignited to inflate or expand the air bag.

The above control system further comprises an acceleration sensor for detecting an acceleration of the vehicle, an integral means for integrating a signal from the acceleration sensor, and a collision judgment means for making a judgment that a vehicle collision has occurred and outputting a trigger signal when the integral value exceeds a trigger threshold level. The transistor is turned on in response to the trigger signal outputted when the vehicle collision has occurred and supplies electric current to the squib. It is necessary that the trigger threshold level is set to a proper level. The reason is that if the trigger threshold level is too low, there is a possibility that the air bag will be accidentally expanded during a normal running condition of the vehicle, and on the other hand, if the trigger threshold level is too high, there is a possibility that the air bag will not be expanded when a vehicle collision has occurred.

In the cases where a center pole collision (only the center of a front portion of the vehicle has collided with a pole) and an under-ride collision (a kind of collision in which the vehicle climbs over an obstacle) have occurred (in these cases, the air bag is required to be expanded), the degree of deceleration is small at the time immediately after the vehicle collision has occurred and the degree of deceleration is abruptly increased from a certain time point. Therefore, there are problems which are difficult for the conventional control system to overcome. Specifically, in a vehicle collision of the type mentioned above, the degree of deceleration of the vehicle speed is small immediately after the vehicle collision has occurred and therefore, an integral value of a corresponding acceleration signal is also small. This means that it takes a longer time for the integral value to exceed the trigger threshold level than other types of vehicle collision. The result is that the supply of electric current to the squib is delayed which in turn delays the expansion of the air bag from a desired good timing.

Japanese Laid-Open Patent Application No. Hei 3-243445 (corresponding to U.S. Pat. No. 5,262,949) discloses a technique for adjusting a trigger threshold level in accordance with the acceleration and speed of a vehicle. However, no consideration is paid to the frequency of the acceleration signal as in the present invention.

SUMMARY OF THE INVENTION

It is therefore an object of the present invention to provide a system for controlling a safety device for a vehicle in which the timing for activating the safety device can be varied depending on the type of a vehicle collision by properly adjusting a trigger threshold level in accordance with the type of a vehicle collision.

According to the present invention, there is provided a system for controlling a safety device for a vehicle, comprising:

(a) an acceleration sensor for detecting an acceleration acting on the vehicle;

(b) an integral means for integrating an acceleration signal from the acceleration sensor;

(c) collision judgment means for comparing an integral value obtainable in the integral means with a trigger threshold level and making a judgment that a vehicle collision has occurred when the integral value, which is increased in a decelerating direction, exceeds the trigger threshold level, the collision judgment means outputting a trigger signal when the collision judgment means made the judgment that a vehicle collision has occurred;

(d) drive circuit constructed by connecting a switching means, which is turned on in response to the trigger signal, to an activator in series;

(e) a band-pass filter for allowing passage of components of a particular frequency band contained in the acceleration signal from the acceleration sensor; and (f) adjustment means for adjusting the trigger threshold level based on the acceleration components which have passed the band-pass filter.

DETAILED DESCRIPTION OF THE EMBODIMENT

One embodiment of the present invention will now be described with reference to the accompanying drawings, in which a control system of the invention is applied to an air bag device.

Figure 1:
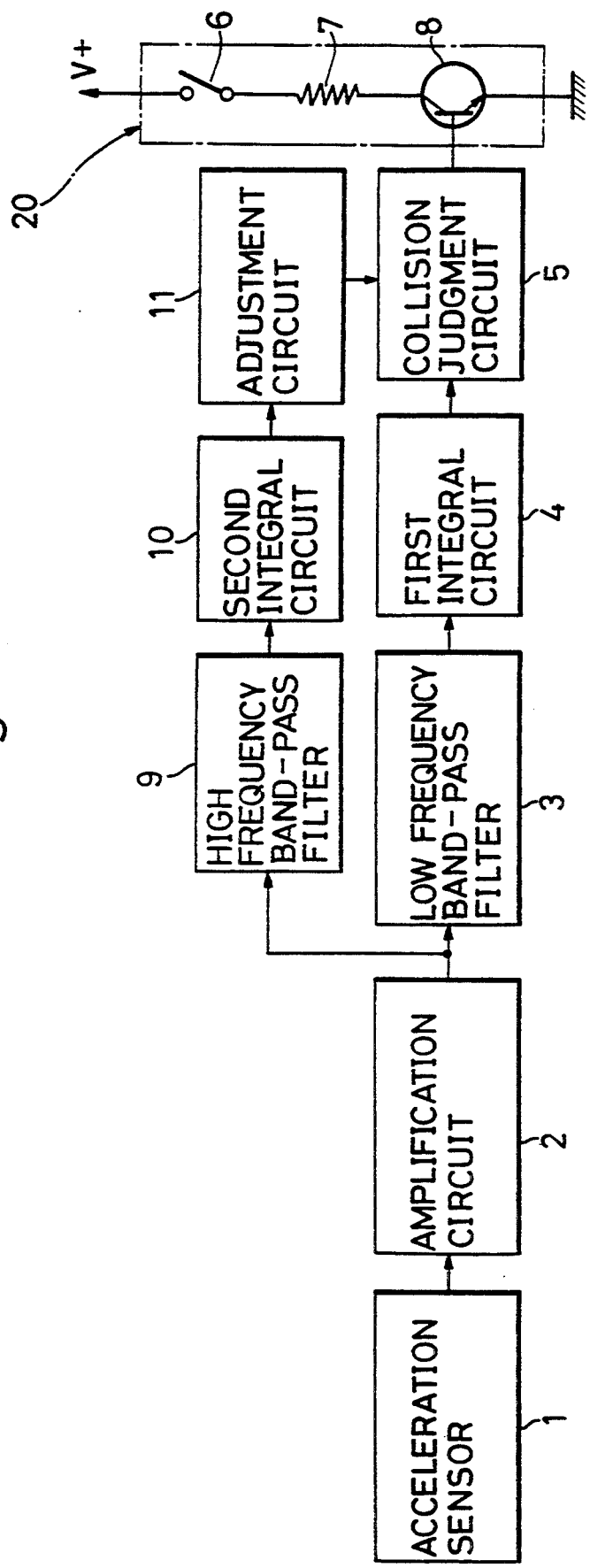
FIG. 1 is a circuit diagram showing one embodiment of a control system according to the present invention.

FIG. 1 shows a circuitry construction of the control system. This control system comprises an acceleration sensor 1 for detecting an acceleration acting on a vehicle, an amplification circuit 2 for amplifying an acceleration signal from the acceleration sensor 1, a band-pass filter 3 for allowing passage of low frequency components of wide band (1 to 150 Hz) contained in the amplified acceleration signal, a first integral circuit 4 for integrating the frequency components which have passed the band-pass filter 3, and a squib drive circuit 20 (drive circuit) provided between a large capacity condenser(not shown) and the ground.

The squib drive circuit 20 includes, in order from the large condenser side, a safety switch 6, a squib 7 (activator) for the air bag, and a transistor 8 (switching means), all arranged in series. The condenser is charged from a battery.

The collision judgment circuit 5 compares an integral value obtained in the first integral circuit 4 with a trigger threshold level and judges that a vehicle collision has occurred when the integral value, which is increased in a decelerating direction, exceeds the trigger threshold level. When the collision judgment circuit 5 made a judgment that a vehicle collision has occurred, it outputs a high-level trigger signal to the transistor 8 so that the transistor 8 is turned on.

The safety device 6 comprises an elongated lead switch, for example. Annexed to the lead switch 6 are a magnet capable of moving along the lead switch and a spring for biasing the magnet. The magnet is moved against the spring by an impact of a lower level than that of an impact based on which the collision judgment circuit 5 judges that a vehicle collision has occurred. This causes the safety switch 6 to be turned on.

The control system further comprises a band-pass filter 9 for allowing passage of components of particular frequency band (200 to 300 Hz) which are comparatively high and narrow, a second integral circuit 10 for integrating only one polar component (for example, component in a decelerating direction) of all the acceleration components which have passed the band-pass filter 9, and an adjustment circuit 11 for adjusting the trigger threshold level based on the integral value obtained in the second integral circuit 10.

Figure 2:
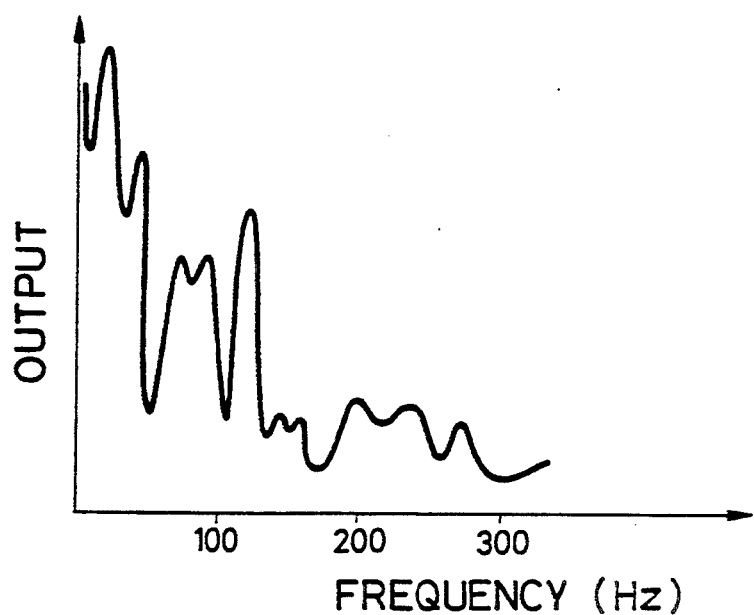
FIG. 2 is a chart showing a frequency distribution of deceleration of a vehicle speed when a center pole collision has occurred.

The outline of the procedure for adjusting the trigger threshold for the collision judgment circuit 5 in the control system will be described with reference to FIGS. 2 and 3.

When a vehicle collision has occurred which is so violent as requiring an expansion of the air bag, the acceleration signal from the acceleration sensor 1 shows a radical deceleration. FIG. 2 shows a frequency distribution of the acceleration signal when a violent center pole collision has occurred. As apparent from this Figure, although frequency components of 1 to 150 Hz occupy a major portion in the acceleration signal, there still exist components of a frequency band of 200 to 300 Hz. The frequency components of 200 to 300 Hz are by far larger compared with such degree of deceleration as requiring no expansion of the air bag. The frequency components of 1 to 150 Hz contained in the acceleration signal which has been amplified in the amplification circuit 2 are allowed to pass the band-pass filter 3, while the frequency components of 200 to 300 Hz are allowed to pass the other band-pass filter 9.

Figure 3:
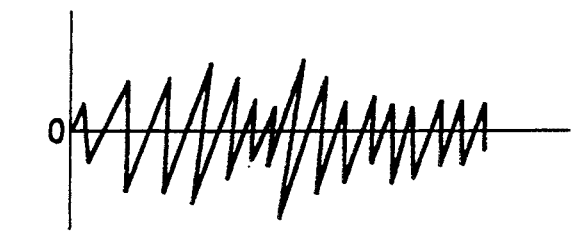
FIG. 3 is a time chart showing the processing of a signal in accordance with the above embodiment.
Figure 3:
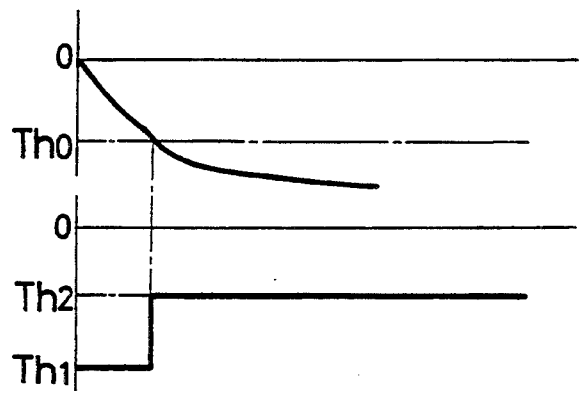
Figure 3:
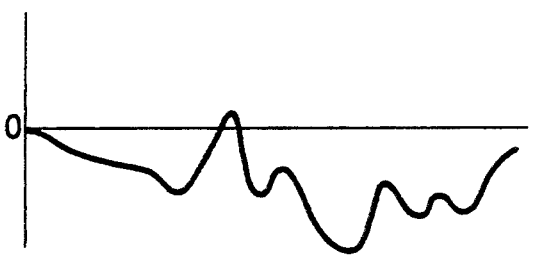
Figure 3:
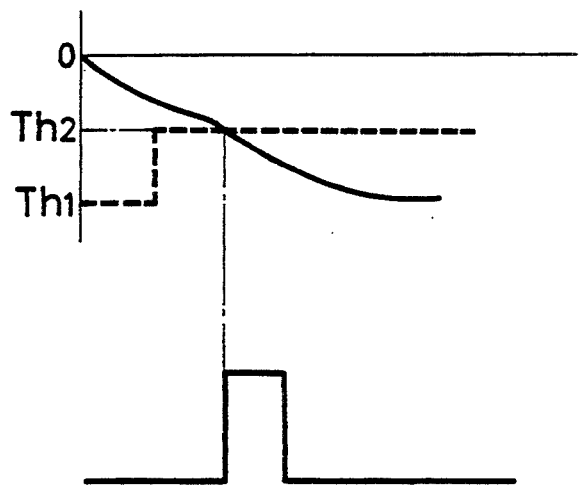

As shown in a somewhat exaggerated manner in FIG. 3, output of the frequency components of 200 to 300 Hz are started from an early stage of a vehicle collision. Therefore, the integral value in the second integral circuit 10 begins to increase from an early stage of a vehicle collision and exceeds a threshold $Th_0$ (the level indicated by one point chain line) for the adjustment circuit 11 in a comparatively short time. As a result, the trigger threshold level for the collision judgment circuit 5 is changed from a threshold level $Th_1$ having a large absolute value to a trigger threshold level $Th_2$ having a small absolute value.

As mentioned above, the frequency components of 1 to 150 Hz contained in the acceleration signal occupy a major part of the acceleration signal at the time when a vehicle collision has occurred. Accordingly, the integral value obtained in the first integral circuit 4 by integrating the acceleration signal which has passed the band-pass filter 3 includes an overall information about the state of a vehicle collision and is therefore suitable to be used as a basis for making a collision judgment. Therefore, a collision judgment, which is made in the collision judgment circuit 5 based on this integral value, is correct. In the center pole collision case, the integral value obtained in the first integral circuit 4 is comparatively gradually increased because the output of the acceleration signal is small at an early stage of the vehicle collision. However, as mentioned above, since the trigger threshold level is changed to $Th_2$ at an early time (or in a short time), this integral value can exceed $Th_2$ at an early time (or in a short time). As a consequence, it becomes possible to output the trigger signal at an early time so that the air bag is expanded at a good timing.

In the case of a normal vehicle collision (i.e., a vehicle collision with an obstacle generally over the entire front portion of the vehicle), the acceleration components of 200 to 300 Hz are small and the trigger threshold level $Th_1$ is maintained as it is. In this case, however, since the acceleration components of 1 to 150 Hz are large, the integral value in the first integral circuit 4 reaches the trigger threshold level at a comparatively early time. As a result, the air bag can be expanded at a good timing.

In this embodiment, even in the case where the transistor 8 is turned on by noise stolen into the signal line from the acceleration sensor 1 to the collision judgment circuit 5, the air bag is not accidentally expanded because the safety switch 6 is held in its OFF-state.

Another embodiment of the present invention will now be described with reference to FIG. 4. In this embodiment, a transistor 15 (second switching means) is used for the safety switch 6 of FIG. 1. This transistor 15 is turned on in response to a trigger signal from a second collision judgment circuit 12. This second collision judgment circuit 12 outputs a low level trigger signal when an integral output from a second integral circuit 10 exceeds a second trigger threshold level. Since the remaining constructions are the same as the preceding embodiment, like parts are denoted by like reference numerals and description thereof is omitted.

Figure 4:
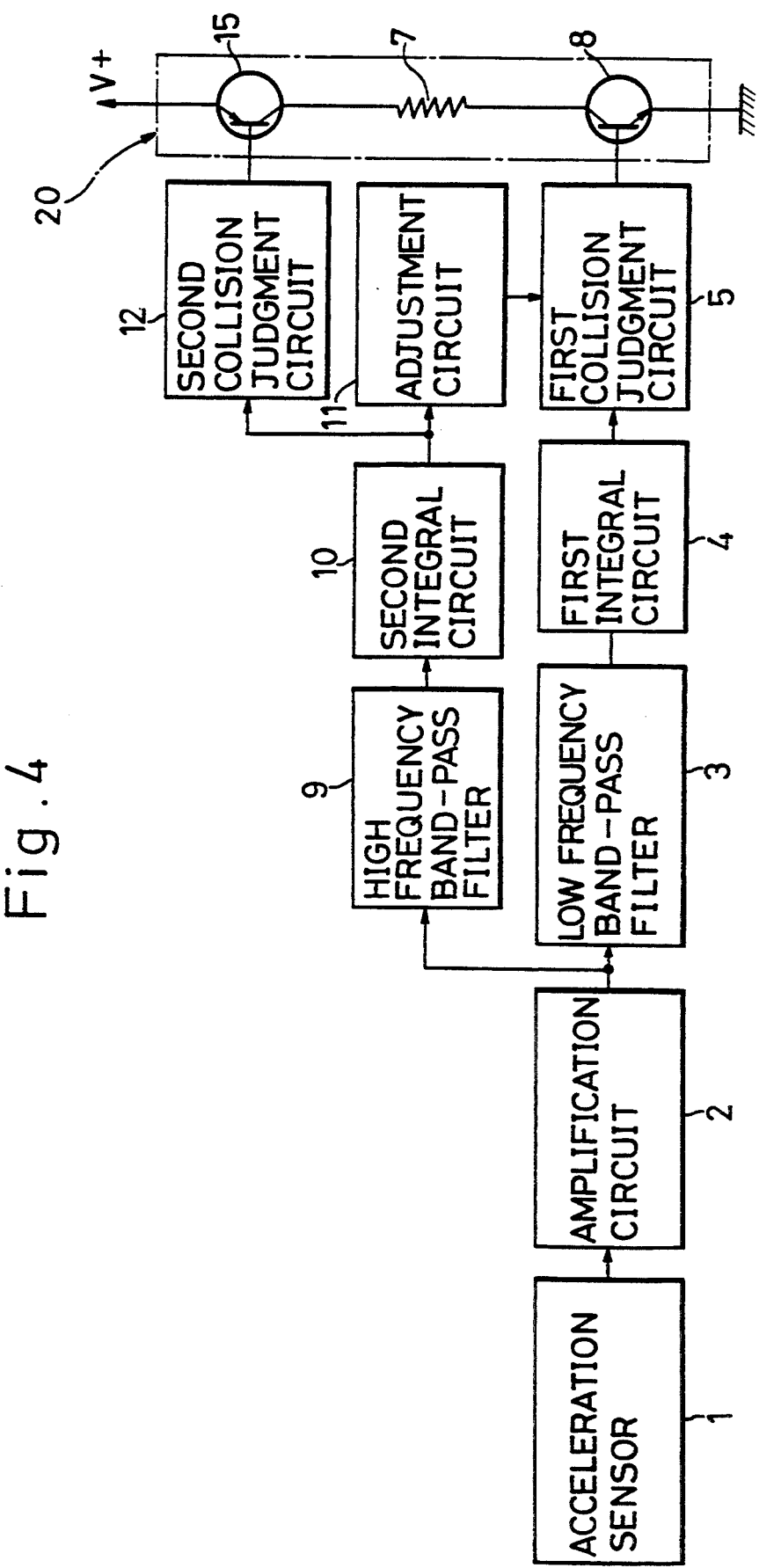
FIG. 4 is a circuit diagram showing another embodiment of the present invention.

In the embodiment of FIG. 4, it is not necessary to use a safety switch in order to protect the system from noise. Specifically, acceleration components of different frequency bands are allowed to pass band-pass filters 3 and 9, and the respective integral values are inputted into a first collision judgment circuit 5 and a second collision judgment circuit 12, respectively. Since the frequency of noise is in a narrow frequency band, when a noise is Generated, one of the integral values to be inputted into one of the collision judgment circuits 5 and 12 is increased but the other integral value is not increased. Therefore, it never happens that both the transistors 8 and 15 are turned on by noise. As a result, the air bag is not accidentally expanded. In this embodiment, since a collision judgment is made based on two integral outputs, the accuracy of judgment is increased.

Figure 5:
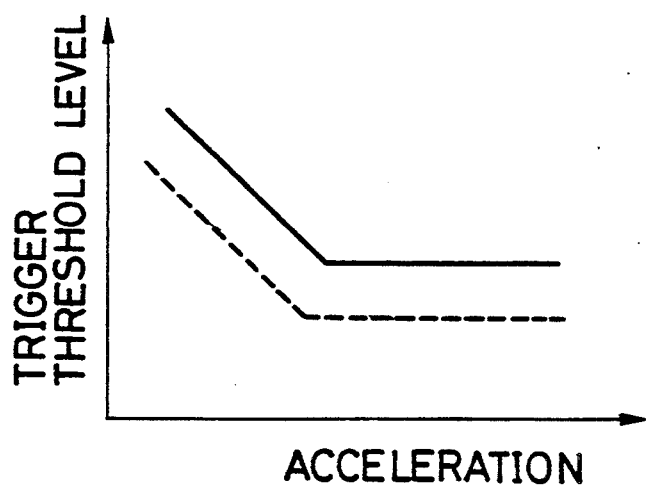
FIG. 5 is a chart showing a method for adjusting the threshold level in accordance with a further embodiment of the present invention.

A further embodiment of the present invention will be described with reference to FIG. 5. In the case where the trigger threshold level for the collision judgment circuit 5 is changed in accordance with the acceleration signal as indicated by a solid line of FIG. 5, the threshold level may be changed from the solid line to a dotted line by the trigger threshold adjustment circuit 11 when the integral output from the second integral circuit 10 is increased. By doing this, the air bag can be expanded at an earlier timing when a violent vehicle collision has occurred.

The present invention is not limited to the above embodiments but many changes and modifications can be made. The trigger threshold adjustment circuit may adjust the trigger threshold level such that it is in inverse proportion to the integral value in the second integral circuit. The present invention may be applied to a system for controlling a pretensioner of a seat belt other than the air bag.

The band-pass filter 3 may be omitted. In that case, acceleration components spreading over the entire band are integrated in the first integral circuit 4. The second integral circuit 10 may integrate only the accelerating direction component contained in the components which has passed the band-pass filter 9.

What is claimed is:

1. A system for controlling a safety device for a vehicle, comprising:
   (a) an acceleration sensor for detecting an acceleration acting on the vehicle;
   (b) an integral means for integrating an acceleration signal from said acceleration sensor;
   (c) collision judgment means for comparing an integral value obtainable in said integral means with a trigger threshold level and making a judgment that a vehicle collision has occurred when the integral value, which is increased in a decelerating direction, exceeds the trigger threshold level, said collision judgment means outputting a trigger signal when said collision judgment means made the judgment that a vehicle collision has occurred;
   (d) drive circuit constructed by connecting a switching means, which is turned on in response to the trigger signal, to an activator in series;
   (e) a band-pass filter for allowing passage of components of a particular frequency band contained in the acceleration signal from said acceleration sensor; and
   (f) adjustment means for adjusting the trigger threshold level based on the acceleration components which have passed said band-pass filter.

2. A system for controlling a safety device for a vehicle according to claim 1, further comprising second integral means for integrating the acceleration components from said band-pass filter, and said adjustment means adjusts the trigger threshold level based on an integral value from said second integral means.

3. A system for controlling a safety device for a vehicle according to claim 2, in which said second integral means integrates only one of an accelerating direction component and a decelerating direction component of the acceleration components from said band-pass filter.

4. A system for controlling a safety device for a vehicle according to claim 3, in which said band-pass filter allows passage of a comparatively high frequency band component of all the acceleration components, and said adjustment means decreases the trigger threshold level when the integral value from said second integral means is large and increases the trigger threshold level when the integral value from said second integral means is small.

5. A system for controlling a safety device for a vehicle according to claim 4, in which said adjustment means decreases the trigger threshold level when the integral value from said second integral means reaches a predetermined level.

6. A system for controlling a safety device for a vehicle according to claim 4, in which said adjustment means makes an adjustment so that the trigger threshold level is in inverse proportion to the integral value from said second integral means.

7. A system for controlling a safety device for a vehicle according to claim 2, further comprising a second band-pass filter for allowing passage of lower frequency band components contained in the acceleration signal from said acceleration sensor than the frequency band components which the first-mentioned band-pass filter allows the passage, and said first-mentioned integral means integrates the acceleration components from said second band-pass filter.

8. A system for controlling a safety device for a vehicle according to claim 2, further comprising second collision judgment means for outputting a second trigger signal when the integral value from said second integral means exceeds a second trigger threshold level, and said drive circuit includes second switching means which is connected to the activator and first-mentioned switching means in series and turned on in response to the second trigger signal.

* * * * *